(12) United States Patent  
Takenaka et al.

(10) Patent No.: US 8,587,809 B2  
(45) Date of Patent: Nov. 19, 2013

(54) INFORMATION PROCESSING APPARATUS, INFORMATION PROCESSING SYSTEM AND COMPUTER READABLE MEDIUM

(75) Inventors: Masaya Takenaka, Kawasaki (JP); Hidenori Itoh, Ebina (JP); Hisaji Hiramatsu, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 851 days.

(21) Appl. No.: 12/711,478

(22) Filed: Feb. 24, 2010

(65) Prior Publication Data

US 2011/0007349 A1    Jan. 13, 2011

(30) Foreign Application Priority Data

Jul. 9, 2009    (JP) .................................. 2009-162322

(51) Int. Cl.  
*G06F 3/12*    (2006.01)

(52) U.S. Cl.  
USPC .............. 358/1.15; 713/1; 713/300; 713/310; 713/320; 713/324; 235/375; 235/382

(58) Field of Classification Search  
USPC ............. 358/1.15, 400, 468; 713/340, 1, 300, 713/310, 320, 324; 235/375, 382  
See application file for complete search history.

(56) References Cited

U.S. PATENT DOCUMENTS 5,917,610 A * 6/1999 Komada et al. ............... 358/400  
7,966,507 B2 * 6/2011 Kanzawa ....................... 713/323  
2001/0048532 A1 * 12/2001 Nishizawa .................... 358/1.14  
2005/0034003 A1 * 2/2005 Sato et al. ...................... 713/340  
2006/0182459 A1 * 8/2006 Shin ............................... 399/88

FOREIGN PATENT DOCUMENTS

| JP | 2002-19231 A | 1/2002 |
| JP | 2002-318675 A | 10/2002 |
| JP | 2006-259181 A | 9/2006 |
| JP | 2006-260186 A | 9/2006 |
| JP | 2007-30295 A | 2/2007 |
| JP | 2007-124309 A | 5/2007 |
| JP | 2008-271225 A | 11/2008 |
| JP | 2009-49699 A | 3/2009 |

OTHER PUBLICATIONS

Office Action, dated May 17, 2013, issued by the Japanese Patent Office in counterpart Japanese Patent Application No. 2009-162322.

* cited by examiner

*Primary Examiner* — Allen H Nguyen  
(74) *Attorney, Agent, or Firm* — Sughrue Mion, PLLC

(57) ABSTRACT

According to an aspect of the invention, an information processing apparatus includes a control unit. The control unit changes a power supply state of the information processing apparatus from a first power supply state where a communication function of the apparatus is activated to a second power supply state where the communication function is inactivated based on a given period and a restoration cause, the control unit keeping the power supply state in the second power supply state in the given period, the control unit keeping the power supply state in the second power supply state after the given period when the restoration cause is detected in the given period.

15 Claims, 11 Drawing Sheets

INFORMATION PROCESSING APPARATUS, INFORMATION PROCESSING SYSTEM AND COMPUTER READABLE MEDIUM

CROSS-REFERENCE TO RELATED APPLICATIONS

This application is based upon and claims priority under 35 USC 119 from Japanese Patent Application No. 2009-162322, filed Jul. 9, 2009.

BACKGROUND

Technical Field

The present invention relates to an information processing apparatus, an information processing system and a computer readable medium.

SUMMARY OF THE INVENTION

According to an aspect of the invention, an information processing apparatus includes a control unit. The control unit changes a power supply state of the information processing apparatus from a first power supply state where a communication function of the apparatus is activated to a second power supply state where the communication function is inactivated based on a given period and a restoration cause, the control unit keeping the power supply state in the second power supply state in the given period, the control unit keeping the power supply state in the second power supply state after the given period when the restoration cause is detected in the given period. Power supply states of the information processing apparatus and a plurality of second information processing apparatus are sequentially changed between the first power supply state and the second power supply state in a circulation manner simultaneously with a certain number of the information processing apparatus and the second information processing apparatus. The given period is determined according to the circulation manner.

BRIEF DESCRIPTION OF THE DRAWINGS

Exemplary embodiments of the invention will be described in detail based on the following figures, wherein.

DETAILED DESCRIPTION

Hereinafter, the concrete exemplary embodiment of the invention will be explained with reference to the drawings. The technical scope of the invention is not limited to the exemplary embodiment described bellow and also includes various changes and improvements thereof in a range where particular effects obtained from the constituent elements of the invention or the combination thereof may be led.

Figure 1:
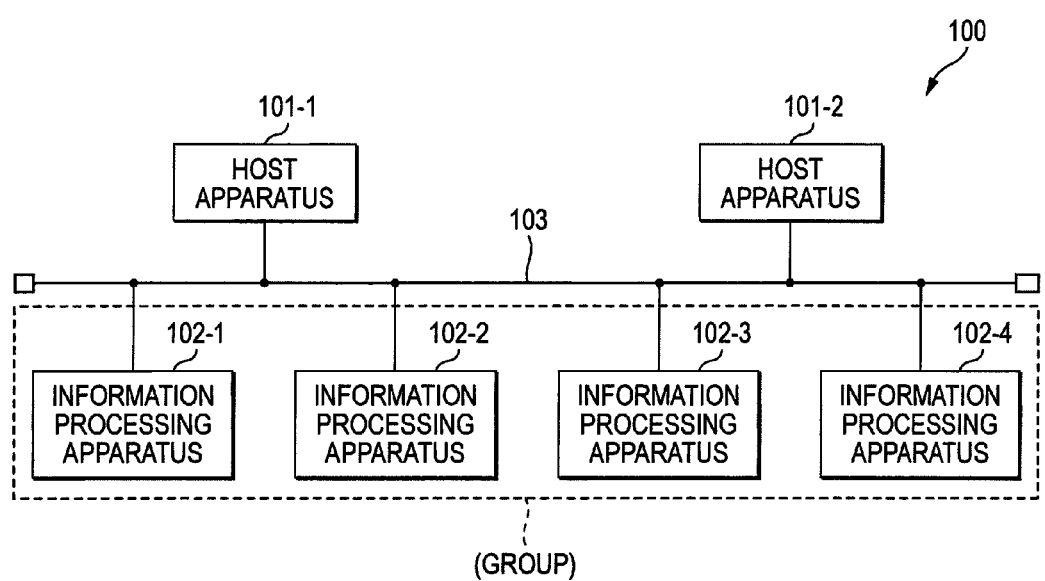
FIG. 1 is a diagram showing an example of the configuration of the information processing system according to the exemplary embodiment of the invention.

FIG. 1 shows an example of the configuration of the information processing system according to the exemplary embodiment of the invention. The information processing system 100 shown in the figure is configured in a manner that two host apparatuses 101 (101-1, 101-2) and four information processing apparatuses 102 (102-1, 102-2, 102-3, 102-4) are mutually coupled via a communication network 103. The communication network 103 is configured by a LAN (Local Area Network), for example. The number of the host apparatuses 101 and the number of the information processing apparatuses 102 to be coupled to the communication network 103 are not limited to the aforesaid numbers, respectively, and so may be changed. However, it is supposed that the number of the host apparatus 101 to be coupled to the network is one or more and the number of the information processing apparatuses 102 to be coupled to the network is two or more. Further, the host apparatus 101 may not be coupled to the communication network 103 at the time of performing a power supply control processing described later.

Each of the four information processing apparatuses 102-1, 102-2, 102-3, 102-4 coupled to the communication network 103 has a communication function. The four information processing apparatuses 102-1, 102-2, 102-3, and 102-4 are related mutually as "a group of the information processing apparatuses" by registering an IP address (Internet Protocol Address) described later, for example. Thus, the four information processing apparatuses 102-1, 102-2, 102-3, 102-4 each coupled to the communication network 103 constitute the group in total.

Each of the host apparatuses 101-1, 101-2 sends the instruction of a processing to the information processing apparatus 102 among the four information processing apparatuses 102-1, 102-2, 102-3, 102-4 via the communication network 103. The information processing apparatus 102 having received the instruction performs a predetermined processing in accordance with the instruction. That is, the host apparatuses 101 and the information processing apparatuses 102 have a relation that the each of the host apparatuses 101 serves as a side of instructing the processing and each of the information processing apparatuses 102 serves as a side of executing the processing instructed.

As a concrete example, it is supposed that each of the host apparatuses 101 is configured by a terminal apparatus such as a computer and each of the information processing apparatuses 102 is configured by an image processing apparatus such as a printer, a copying machine or a facsimile machine. In this case, the terminal apparatus acting as the host apparatus 101 sends an instruction (hereinafter referred to "printing instruction") for printing image information via the communication network 103 to one of the four image processing apparatuses each acting as the information processing apparatus 102. The image processing apparatus thus received the printing information performs a processing of printing the image information thus instructed on recording material such as papers. Each of the information processing apparatuses 102 may be configured by a personal computer, a server etc. in place of the image processing apparatus.

In this exemplary embodiment, the detailed explanation will be made as to the information processing system 100 as to the case, as an example, where each of the two host apparatuses 101 coupled to the communication network 103 is configured by the terminal apparatus and each of the four information processing apparatuses 102 coupled to the communication network 103 is configured by the image processing apparatus, as described above.

Figure 2:
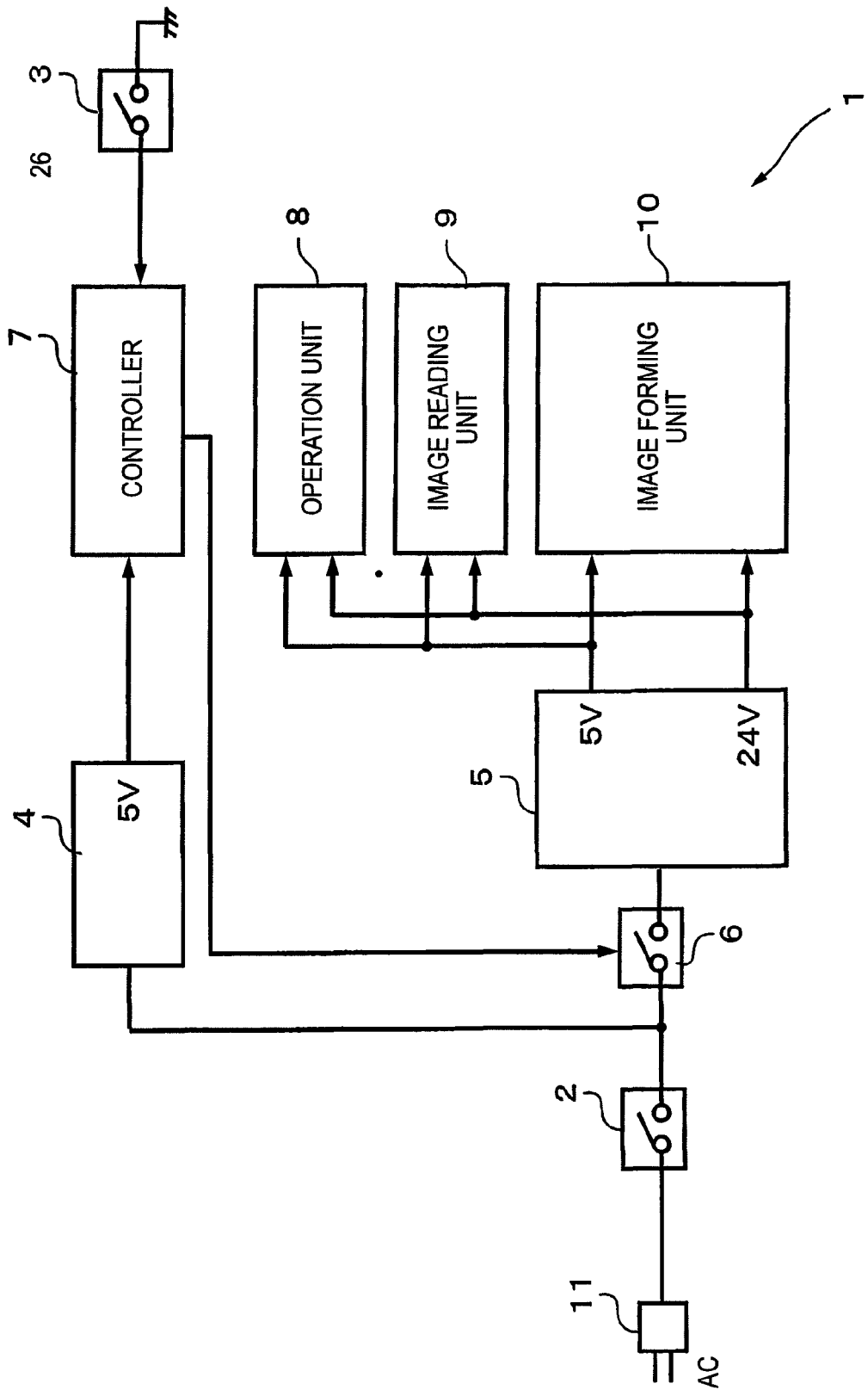
FIG. 2 is a block diagram showing an example of the entire configuration of the image processing apparatus (information processing apparatus) according to the exemplary embodiment of the invention.

FIG. 2 is a block diagram showing an example of the entire configuration of the image processing apparatus (information processing apparatus) according to the exemplary embodiment of the invention. The configuration of image processing apparatus 1 shown in this figure is applied to each of the four information processing apparatuses 102. The image processing apparatus 1 includes a main power supply switch 2, a sub-power supply switch 3, a first power supply unit 4, a second power supply unit 5, a relay 6, a controller 7, an operation unit 8, an image reading unit 9 and an image forming unit 10.

The main power supply switch 2 performs the switching-on/off operation between the relay 6 and a power supply plug 11 which is inserted into and pulled out from a not-shown AC outlet. The main power supply switch 2 is turned on and off in response to a mechanical (human) pressing operation, for example, in a state that the power supply plug 11 is inserted into the AC outlet. The main power supply switch 2 acts to turn on and off the power of AC 100 volt supplied from the AC outlet. Thus, when the main power supply switch 2 is turned off, the power supply to the image processing apparatus 1 is stopped completely. The main power supply switch 2 is turned on and off in the case where the image processing apparatus 1 is set or installed for the first time or the image processing apparatus 1 is moved to another location after the installation.

Like the main power supply switch 2, the sub-power supply switch 3 is turned on and off in response to a mechanical (human) pressing operation, for example. The sub-power supply switch 3 acts to, while supplying the power to the minimum functional portions including the sub-power supply switch 3 within the image processing apparatus 1, stop the power to the remaining portions or to restore from the stop state. The sub-power supply switch 3 is turned on or off depending on the state (on or off state) of the switch itself when the switch is mechanically depressed.

To be concrete, when the sub-power supply switch 3 is depressed in the off-state of the sub-power supply switch 3, the sub-power supply switch 3 is turned on by the depressing operation. In contrast, when the sub-power supply switch 3 is depressed in the on-state of the sub-power supply switch 3, the sub-power supply switch 3 is turned off by the depressing operation. In the following description as to each of the main power supply switch 2 and the sub-power supply switch 3, the states where the power supply switch is turned on and the power supply switch is turned off are also referred as an on state and an off state, respectively.

When the sub-power supply switch 3 is tuned on, an on signal is outputted to the controller 7 from the sub-power supply switch 3. In contrast, when the sub-power supply switch 3 is tuned off, an off signal is outputted to the controller 7 from the sub-power supply switch 3.

The sub-power supply switch 3 always acts as a power supply switch when the main power supply switch 2 is in the on state in the state where the power supply plug 11 is inserted into the AC outlet. The sub-power supply switch 3 is turned on and off in response to the aforesaid mechanical depressing operation during a period until the main power supply switch 2 is placed in the off state (or the power supply plug 11 is pulled out from the AC outlet) after the power supply plug 11 is inserted into the AC outlet and the main power supply switch 2 is placed in the on state. The image processing apparatus 1 is substantially placed in the power-off state when the sub-power supply switch 3 is turned off. Thus, a user using the image processing apparatus 1 performs the turning-on and off operations of the sub-power supply switch 3 in the case of turning the power supply of the image processing apparatus 1 on and off, respectively.

The switching system applied to the main power supply switch 2 and the sub-power supply switch 3 may be a seesaw type, a push button type etc., for example. The main power supply switch 2 and the sub-power supply switch 3 may employ the different types the switching systems (for example, the main power supply switch 2 employs the seesaw type and the sub-power supply switch 3 employs the push button type).

The first power supply unit 4 supplies the power of a prescribed voltage (5 volt in the example shown in the figure) to the controller 7 when the main power supply switch 2 is in the on state.

The second power supply unit 5 supplies the power of prescribed voltages (5 volt and 24 volt in the example shown in the figure) to each of the operation unit 8, the image reading unit 9 and the image forming unit 10 when the main power supply switch 2 is in the on state and the relay 6 is in the on (closed) state.

The relay 6 is provided on the way of a power supply cable (not shown) for coupling the main power supply switch 2 and the second power supply unit 5. The relay 6 performs the on/off (open/close) operation in accordance with a control signal outputted from the controller 7. When the relay 6 is turned on in accordance with the control signal outputted from the controller 7 in the state that the main power supply switch 2 is in the on state, the second power supply unit 5 supplies the power to the operation unit 8, the image reading unit 9 and the image forming unit 10. In contrast, when the relay 6 is turned off in accordance with the control signal outputted from the controller 7 in the state that the main power supply switch 2 is in the on state, the second power supply unit 5 stops the power supply to the operation unit 8, the image reading unit 9 and the image forming unit 10.

The controller 7 controls the entire operation of the image processing apparatus 1 including the operation unit 8, the image reading unit 9 and the image forming unit 10. The inner configuration of the controller 7 will be explained later.

The operation unit 8 is operated by a user who uses the image processing apparatus 1. To be more concrete, the operation unit 8 acts as a user interface (hereinafter also referred to "UI") which is adapted so that a user using the image processing apparatus 1 can input various kinds of information and various information can be displayed to the user. The operation unit 8 is configured by an input part having various kinds of buttons, switches, keys etc., for example, and a display part formed by a liquid crystal display with a touch panel.

The image reading unit 9 optically reads an image recorded on a document. The image reading unit 9 is configured by an image scanner using an imaging device such as CCD (Charge Coupled Device) image sensor, for example.

The image forming unit 10 forms (prints out) an image on a paper as recorded material. The image forming unit 10 is configured by using a print engine for printing an image on a paper by the printing system such as the electrophotographic type, the ink jet type, or the thermal transfer type. The image information as the source of an image to be formed on a paper by the image forming unit 10 may be not only image information read from a document by the image reading unit 9 but also the image information received from an external apparatus via the network or a public circuit etc. or image information read from a portable recording medium such as a USB memory. The image information means electronic information (dada) and so has the same meaning as image data. Thus, in the explanation described later, image information is also described as image data.

<Configuration of Controller>

Figure 3:
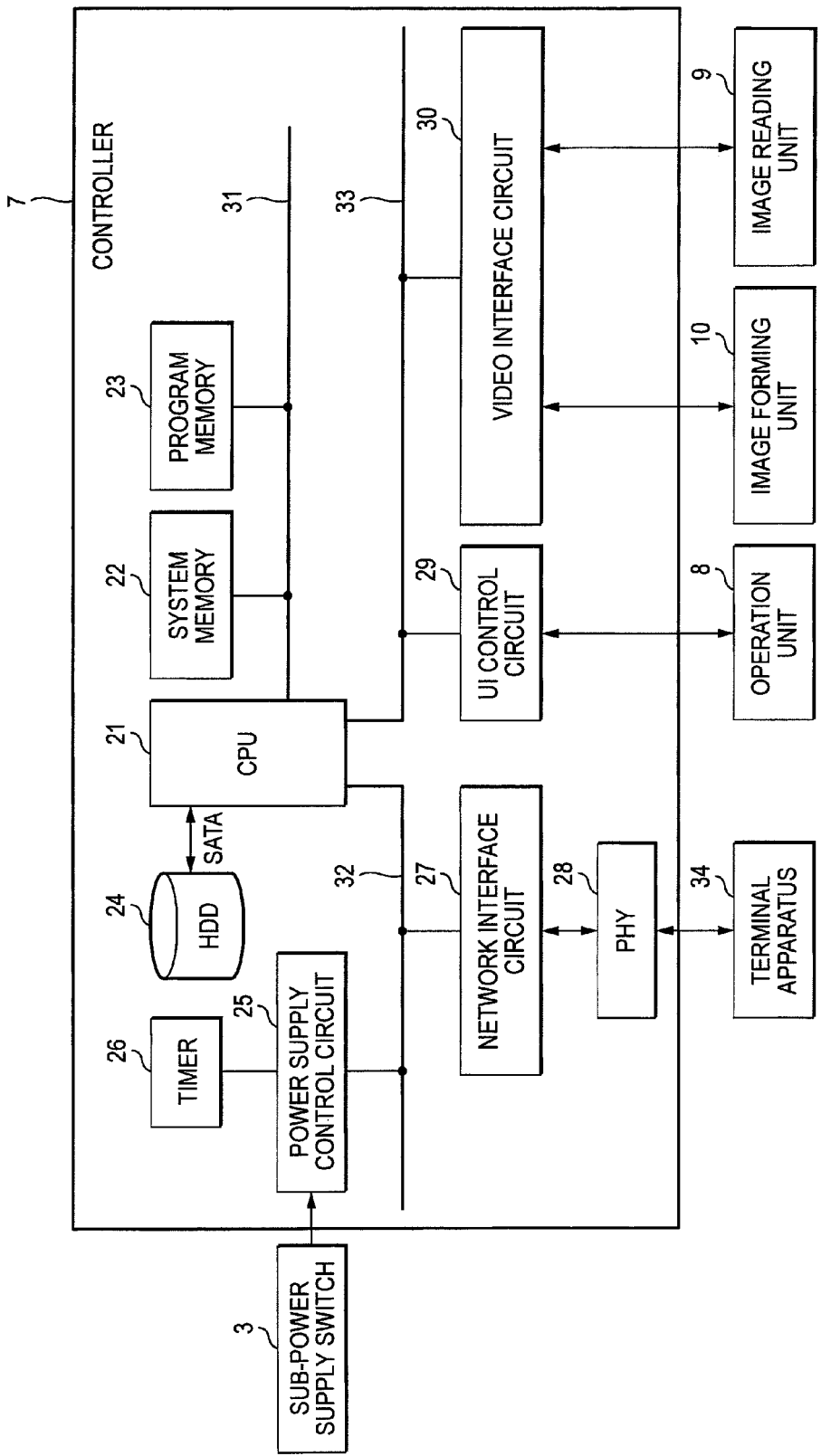
FIG. 3 is a block diagram showing an example of the configuration within a controller.

FIG. 3 is a block diagram showing an example of the configuration within the controller. The controller 7 includes a CPU (Central Processing Unit) 21, a system memory 22, a program memory 23, a hard disc drive 24, a power supply control circuit 25, a timer 26, a network interface circuit (network IF circuit) 27, a PHY (physical layer) chip 28, a UI (User Interface) control circuit 29, a video interface circuit (video IF circuit) 30.

The CPU 21 is coupled to the memory 21 and the program memory 23 via a memory bus 31. The CPU 21 is also coupled to the hard disc drive 24 with the SATA standard, for example. The CPU 21 is further coupled to the power supply control circuit 25 and the network interface circuit 27 via a PCI (Peripheral Components Interconnect) bus 32. The CPU 21 is furthermore coupled to the UI control circuit 29 and the video interface circuit 30 via a PCI bus 33 which constitutes another system different from the PCI bus 32.

The CPU 21 reads various kinds of programs stored in the program memory 23 and stores the programs thus read in the system memory 22 and executes the programs thus stored to thereby perform various kinds of processings. The CPU 21 contains therein a memory controller for controlling the data writing and reading with respect to the system memory 22. The memory controller may be configured separately from the CPU 21.

The system memory 22 is used as a work memory for the CPU 21. The system memory 22 is provided n the controller 7 as a volatile storage medium. The system memory 22 is formed by a DRAM (Dynamic Random Access Memory) or a SRAM (Static Random Access Memory), for example, as one of semiconductor storage elements. In this exemplary embodiment, the system memory 22 is formed by the DRAM having a self refresh (self rewriting operation) function, as an example. The volatile storage medium means a storage medium which storage contents is erased when power supplied thereto is interrupted.

The program memory 23 stores the various kinds of the programs for realizing functions provided by the image processing apparatus 1. The programs stored in the program memory 23 include a control program for controlling the operation of the image processing apparatus 1, and an image processing program for subjecting image data treated by the image processing apparatus 1 to an image processing (for example, processings such as color conversion, color correction, tone correction, enlargement/reduction, image rotation, screen generation), for example. The program memory 23 is formed by using a PROM (Programmable Read Only Memory), for example.

The hard disc drive 24 is used to store various kinds of data including image data treated by the image processing apparatus 1. The hard disc drive 24 is provided in the controller 7 as a non-volatile storage medium. The non-volatile storage medium means a storage medium which holds the storage contents even when power supplied thereto is interrupted.

The power supply control circuit 25 operates the relay to thereby control the power supply to the operation unit 8, the image reading unit 9 and the image forming unit 10 and also control the power supply within the controller 7. The power supply control circuit 25 receives the on signal or the off signal from the sub-power supply switch 3.

The power supply control circuit 25 controls the power supply to the respective portions of the image processing apparatus 1 including the controller 7. The power supply control circuit 25 sets or changes the power supply state of the image processing apparatus 1 based on a predetermined condition. The power supply states of the image processing apparatus 1 include a plurality of power supply states of different consumption amounts per a unit time period. In this exemplary embodiment, it is supposed that there are three power supply states of a power supply on state, a sleep state and a power supply off state. The power supply off state corresponds to one mode of "a first power supply state" and the sleep state corresponds to one mode of "a second power supply state". The power supply control circuit 25 changes the power supply state of the image processing apparatus 1.

The power supply on state is applied in the case where the image processing apparatus 1 actually performs an image forming operation or is in a standby state where the image processing apparatus is waiting for the next processing after completing the image forming operation. In the case where the image processing apparatus 1 is in the power supply on state, the power is supplied to all the function portions within the controller 7 by the first power supply unit 4 and the power is supplied to the operation unit 8, the image reading unit 9 and the image forming unit 10 by the unit 5. Thus, in the power supply on state, the communication function of the image processing apparatus 1 is activated. In the succeeding explanation, the power supply on state where the image processing apparatus 1 is performing the image forming operation is also referred to "a run state" and the power supply off state where the image processing apparatus 1 is in the standby state and waiting for the next processing is also referred to "a standby state".

Figure 4:
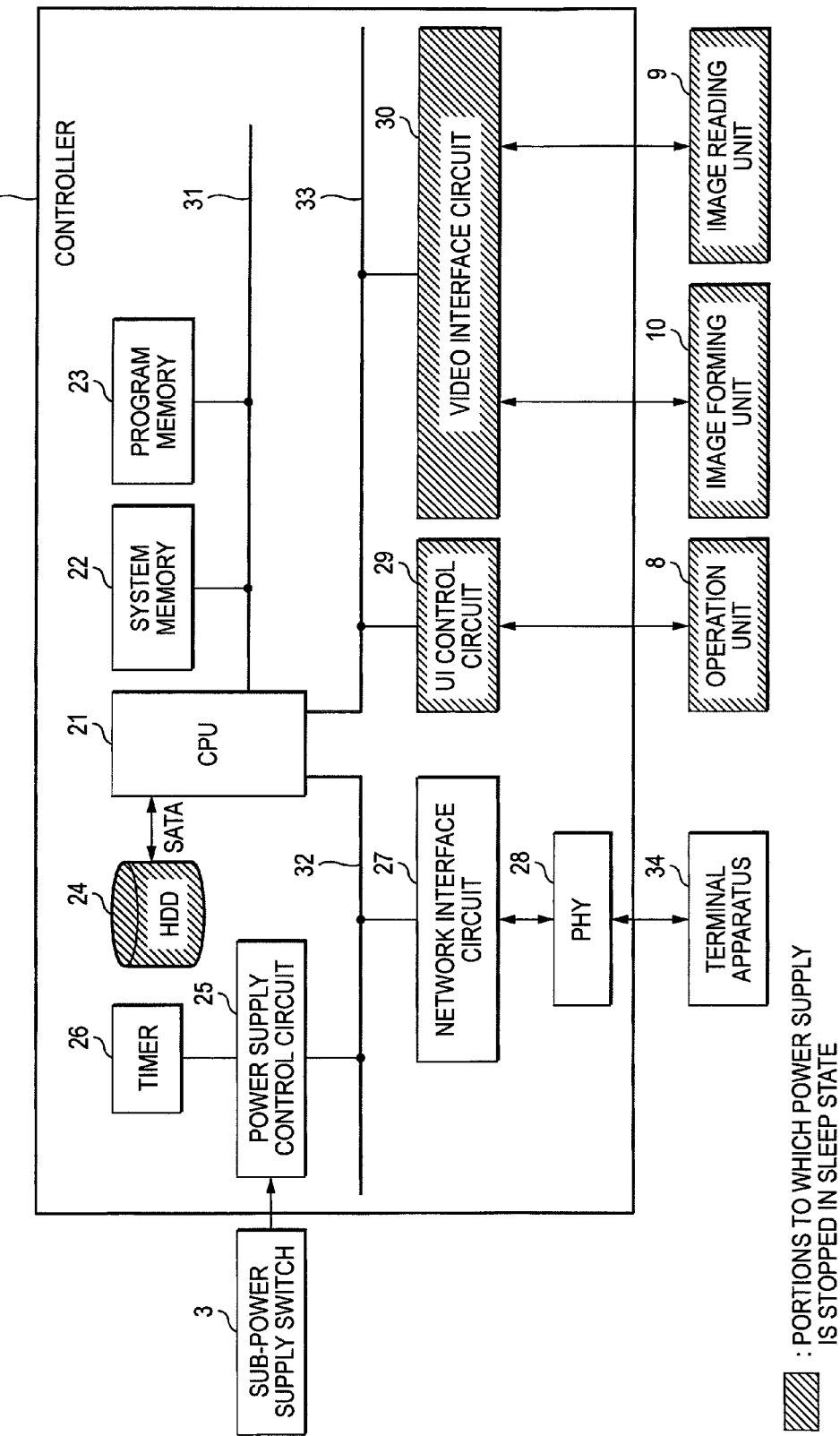
FIG. 4 is a diagram showing the power supply state within the controller in a sleep state.

The sleep state is applied in the case where a time period during which the image processing apparatus 1 substantially stops the image forming operation after being placed in the standby state and waiting for the next processing exceeds a preset time period. In the sleep state, the consumption amount is larger than the off state and lower than the on state. The timer 26 measures the time period during which the image processing apparatus 1 is placed in the standby state and waiting for the next processing. When the image processing apparatus 1 is in the sleep state, the relay 6 is placed in the off state to thereby interrupt the power supply to the operation unit 8, the image reading unit 9 and the image forming unit 10. Further, when the image processing apparatus 1 is in the sleep state, the power supply to the hard disc drive 24, the UI control circuit 29 and the video interface circuit 30 is interrupted within the controller 7 as shown in FIG. 4. However, in the sleep state, the power is supplied to the network interface circuit 27 and the PHY chip 28 for performing the communication function of the image processing apparatus 1. Thus, in the sleep state, the communication function of the image processing apparatus 1 is kept in the activation state.

Figure 5:
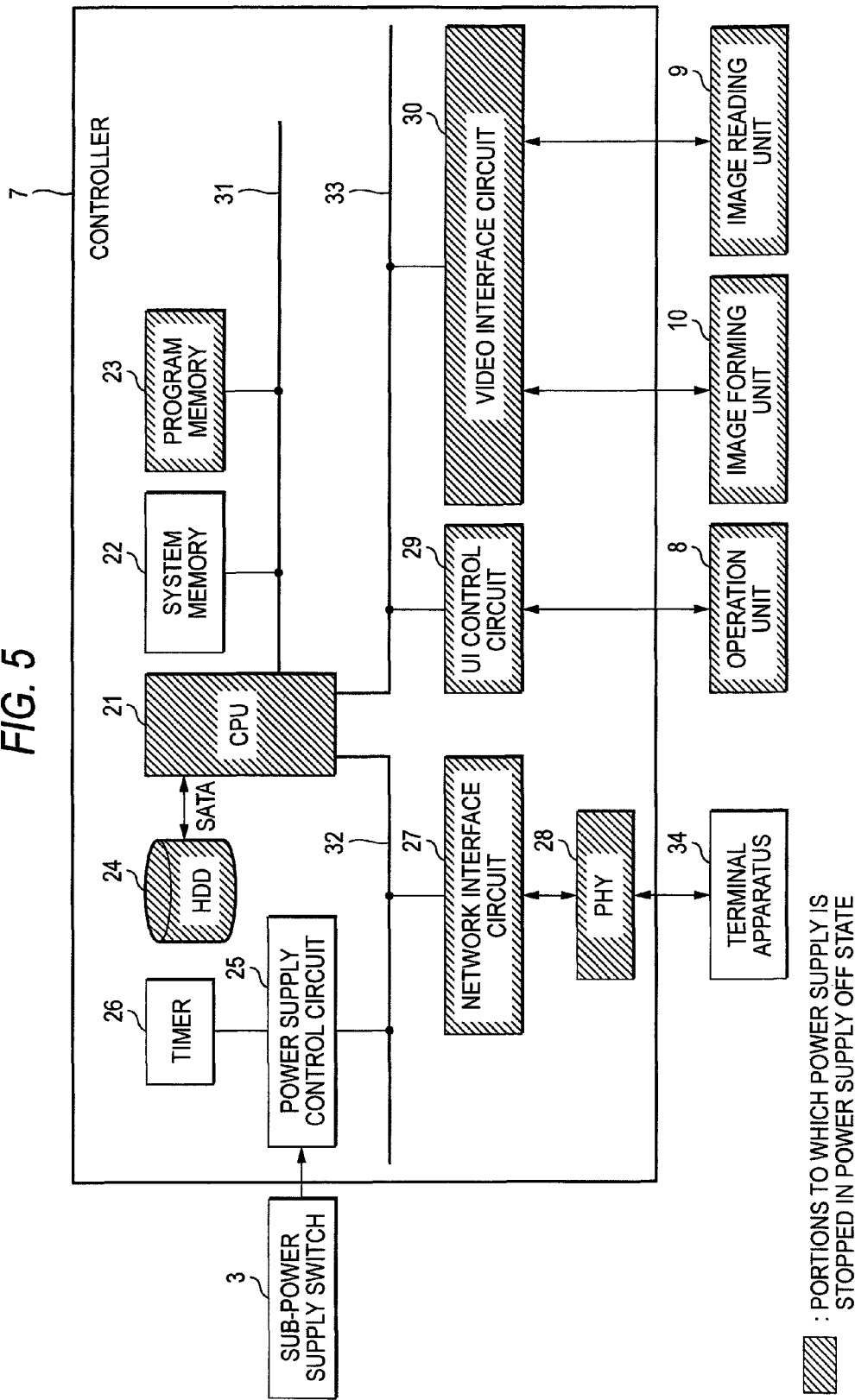
FIG. 5 is a diagram showing the power supply state within the controller in a power supply off state.

The power supply off state is applied in the case where the sub-power supply switch 3 is subjected to the depressing operation and so the sub-power supply switch 3 is changed to the off state from the on state, that is, the sub-power supply switch 3 is turned off. In the case where the image processing apparatus 1 is in the power supply off state, as shown in FIG. 5, in addition to the stop of the power supply in the aforesaid sleep state, the power supply to the CPU 21, the program memory 23, the network interface circuit 27 and the PHY chip 28 within the controller 7 is also interrupted. That is, power is supplied only to the system memory 22, the power supply control circuit 25 and the timer 26 within the image processing apparatus 1 (including the controller 7). In the case of shifting to the power supply off state, the CPU 21 writes the register information of the CPU 21 and the information for the restoration into the system memory 22 and the CPU 21 sets the system memory 22 to the self refresh mode. In the power supply off state, the power supply to the network interface circuit 27 and the PHY chip 28 for performing the communication function of the image processing apparatus 1 is interrupted. Thus, in the power supply off state, the communication function of the image processing apparatus 1 is kept in the stop state.

The timer 26 is provided as a timer means for measuring a time period.

The network interface circuit 27 is provided so as to communicate with another device (a terminal apparatus 34 in the example shown in the figure) other than the own device via the communication network 103. The terminal apparatus 34 is coupled to the communication network 103 as the host apparatus 101. The network interface circuit 27 is coupled to the communication network 103 via the PHY chip 28.

The UI control circuit 29 transmits/receives data for the operation to/from the operation unit 8. The data for the operation includes data transmitted to the operation unit 8 from the UI control circuit 29 and data transmitted to the UI control circuit 29 from the operation unit 8. For example, the data transmitted to the operation unit 8 from the UI control circuit 29 includes display data for displaying various kids of operation screens on the display part of the operation unit 8. The data transmitted to the UI control circuit 29 from the operation unit 8 includes input data inputted by a user via the input part of the operation unit 8, for example.

The video interface circuit 30 transmits/receives various kinds of data (image data, control data etc.) to/from the image reading unit 9 and the image forming unit 10 each serving as an input/output device of image data. For example, image data obtained when the image reading unit 9 optically reads the image of a document is sent to the video interface circuit 30 from the image reading unit 9. Further, image data to be outputted to a paper by the image forming unit 10 is sent to the circuit 10 from the video interface circuit 30. Further, control data for controlling the operation of the image reading unit 9 is sent to the image reading unit 9 from the video interface circuit 30, whilst control data for controlling the operation of the image forming unit 10 is sent to the image forming unit 10 from the video interface circuit 30.

Figure 6:
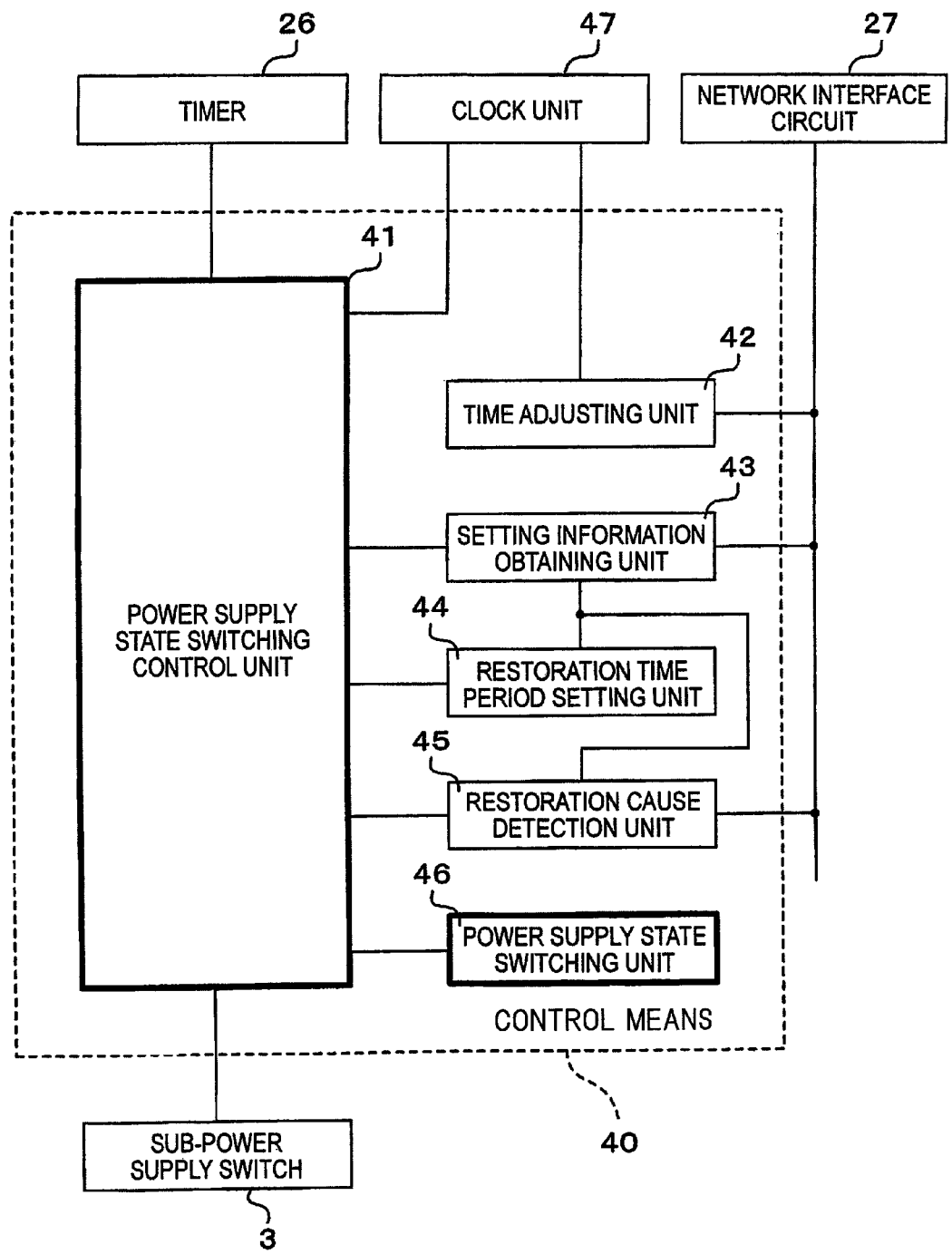
FIG. 6 is a block diagram showing the functional configuration of the image processing apparatus relating to the power supply control.

FIG. 6 is a block diagram showing the functional configuration of the image processing apparatus 1 mainly relating to the power supply control. In FIG. 6, the control means 40 is realized by the software using the computer of the image processing apparatus 1. The hardware resource of the computer of the image processing apparatus 1 includes the CPU 21, the system memory 22, the program memory 23, the hard disc drive 24 and the power supply control circuit 25.

The CPU 21 reads programs stored in the program memory 23 and stores the programs in the system memory 22 and executes the programs to perform predetermined processings. The power supply control circuit 25 is formed by an integrated circuit chip, for example, and executes a predetermined processing in accordance with a program stored in the chip in advance. The power supply control circuit may execute the predetermined processing by using a logic circuit, a sequence circuit or the combination circuit thereof in place of executing the software program, for example. The control means 40 is configured by using a processing function which is realized by executing the program by the CPU 21 and a processing function which is realized by executing the program by the power supply control circuit 25. The programs described above may be extracted as one of the inventions. The programs may be provided by storing into a computer readable medium and a recording medium such as a CD-ROM or provided by means of a wireless or wired communication means.

The control means 40 includes a power supply state switching control unit 41, a time adjusting unit 42, a setting information obtaining unit 43, a restoration time period setting unit 44, a restoration cause detection unit 45 and a power supply state switching unit 46. The functions of the power supply state switching control unit 41 and the power supply state switching unit 46 are realized by the power supply control circuit 25 in a manner that these functions do not stop even when the power supply state of the image processing apparatus 1 is in the power supply off state. In contrast, the functions of the time adjusting unit 42, the setting information obtaining unit 43, the restoration time period setting unit 44 and the restoration cause detection unit 45 are realized by the CPU 21. However, the functions of the setting information obtaining unit 43, the restoration time period setting unit 44 and the restoration cause detection unit 45 may be partially realized by the power supply control circuit 25.

The control means 40 is connected to a clock unit 47, the sub-power supply switch 3, the timer 26 and the network interface circuit 27. The clock unit 47 is incorporated within the image processing apparatus 1. The clock unit 47 is provided as a clock means for clocking the current time. The clock unit 47 is arranged to continuously clock the current time even if the power supply state of the image processing apparatus 1 is in the power supply off state.

The power supply state switching control unit 41 controls the switching of the power supply state of the own apparatus (the image processing apparatus 1). The power supply state switching control unit 41 controls the switching of the power supply state of the own apparatus (the image processing apparatus 1) in accordance with a restoration time period set by the restoration time period setting unit 44 and the detection result of a restoration cause detected by the restoration cause detection unit 45.

The time adjusting unit 42 adjusts the current time of the clock unit 47 to the reference time. The time adjusting unit 42 obtains information (hereinafter referred to "reference time information") representing the reference time from an external apparatus on the communication network 103 via the network interface circuit 27. The time adjusting unit 42 adjusts the time of the clock unit 47 by using the reference time information so that the current time of the clock unit 47 coincides with the reference time.

The reference time information may be obtained in a manner that, if a clock server is coupled to the communication network 103, the IP address of the clock server is registered in the time adjusting unit 42 in advance and the time adjusting unit obtains the reference time information from the clock server.

In place of the aforesaid arrangement, the current time of a clock unit contained in one of the four information processing apparatuses 102 coupled to the communication network 103 may be treated as the reference time. In this exemplary embodiment of the invention, the current time of the clock unit contained in the information processing apparatus 102-1 is treated as the reference time. In this case, the IP address of the information processing apparatus 102-1 is registered as the obtaining destination of the reference time information in at least the three information processing apparatuses 102-2, 102-3 and 102-4 other than the information processing apparatus 102-1. Each of the three information processing apparatuses 102-2, 102-3 and 102-4 other than information processing apparatus 102-1 obtains the reference time information from the common information processing apparatus 102-1 designated by the IP address by using the function of the time adjusting unit 42.

The setting information obtaining unit 43 obtains information (hereinafter referred to "restoration time period setting information") for setting a restoration time period for restoring the power supply state of the information processing apparatus (own apparatus) 1 to the sleep state from the power supply off state.

The restoration time period setting information obtained by the setting information obtaining unit 43 includes following information.

(1) a time for starting the power supply control with respect to the group of the apparatuses (2) a time for completing the power supply control with respect to the group of the apparatuses (3) a restoration maintaining time period per once (4) the number of the apparatuses belonging to the group (5) a restoration order (6) IP addresses of the apparatuses belonging to the group Supposing that the number of the information processing apparatuses 102 coupled to the communication network 103 is defined as N (N is a natural numeral of 2 or more), the restoration time period is a time period allocated to each of the information processing apparatuses 102 under a condition that M (M is a natural numeral smaller than N) apparatus (apparatuses) among the N information processing apparatuses 102 belonging to the group are at once restored to the sleep state from the power supply off state in a circulation manner.

In this exemplary embodiment of the invention, in the network environment where the four information processing apparatuses 102 are coupled to the communication network 103, the restoration time period is allocated to each of the information processing apparatuses 102 under a condition that the four information processing apparatuses 102 are sequentially restored to the sleep state from the power supply off state one by one in a circulation manner. In this case, N is 4 and M is 1. However, the values of N and M are not limited thereto and M may be 2 or 3 since the value of M is defined as the natural numeral smaller than N. In the case of M=2, the two information processing apparatuses among the four information processing apparatuses are changed at once to the sleep state from the power supply off state in a manner that the combination of the two information processing apparatuses among the four information processing apparatuses is sequentially changed. In the similar manner, in the case of M=3, the three information processing apparatuses among the four information processing apparatuses are changed at once to the sleep state from the power supply off state in a manner that the combination of the three information processing apparatuses among the four information processing apparatuses is sequentially changed.

The allocation of the restoration time periods is performed by sharing the restoration time period setting information with the respective information processing apparatuses 102 belonging to the group. The sharing of the restoration time period setting information is realized in a manner that, for example, the restoration time period setting information is registered (stored) in one of the information processing apparatuses 102 in advance, and others of the information processing apparatuses 102 obtain the restoration time period setting information from the one information processing apparatus 102 in which the restoration time period setting information is registered. In place of this method, the sharing of the restoration time period setting information may be realized in a manner that the restoration time period setting information is registered (stored) in a management server different from the information processing apparatuses 102 belonging to the group, and each of the information processing apparatuses 102 obtains the restoration time period setting information from the management server. In the exemplary embodiment of the invention, the former method is employed as an example and so the restoration time period setting information is registered in the information processing apparatus 102-1.

Supposing that three apparatuses of an apparatus A, an apparatus B and an apparatus C constitute a group of the apparatuses, the "circulation manner" means that the apparatus restoring to the sleep state from the power supply off state is switched (rotated) in a manner of the apparatus A→the apparatus B→the apparatus C→the apparatus A→the apparatus B→the apparatus C the apparatus A→the apparatus B→the apparatus C→the apparatus A→the apparatus B→. . . (hereinafter repeated in the similar manner). In this case, when the apparatus to be restored to the sleep state from the power supply off state is switched from the apparatus B to the apparatus C, for example, the power supply state of the apparatus C restores to the sleep state from the power supply off state in place of that the power supply state of the apparatus B shifts to the sleep state from the power supply off state. That is, the apparatus A, the apparatus B and the apparatus C are restored to the sleep state sequentially one by one.

The restoration time period is a time period from a time point where one of the three apparatuses A, B and C restores to the sleep state from the power supply off state until a time point where the one of the three apparatuses returns the power supply off state from the sleep state. In the apparatus A, for example, the restoration time period of the apparatus A is defined by a time point (hereinafter referred to "a restoration time point") where the apparatus A restores to the sleep state from the power supply off state and a time period (hereinafter referred to "a restoration maintaining time period") where the apparatus A is maintained in the sleep state after the restoration time point. Supposing that the time period required for restoring all the apparatuses A, B and C from the power supply off state to the sleep state one by one in the order of the apparatuses A, B and C in the aforesaid manner is one period, the restoration time period (restoration time point) of the apparatus A is set for each period. This is performed for each of the other apparatuses B and C.

Of the restoration time period setting information, the start time point of the power supply control for the group of the information processing apparatuses is registered at 6:00 p.m., for example. Further, the termination time point of the power supply control for the group of the information processing apparatuses is registered at 9:00 a.m., for example. In this case, the power supply control for the group of the information processing apparatuses starts at 6:00 p.m. and terminates at 9:00 a.m. of the next day.

The restoration maintaining time period per one time is registered as 30 minutes, for example.

The order of the restoration is registered from the first to the N-th for the N information processing apparatuses belonging to the group. In the exemplary embodiment of the invention, the group is configured by the four information processing apparatuses 102. Thus, as an example, the information processing apparatus 102-1 is registered as the first, the information processing apparatus 102-2 is registered as the second, the information processing apparatus 102-3 is registered as the third and the information processing apparatus 102-4 is registered as the fourth.

Figure 7:
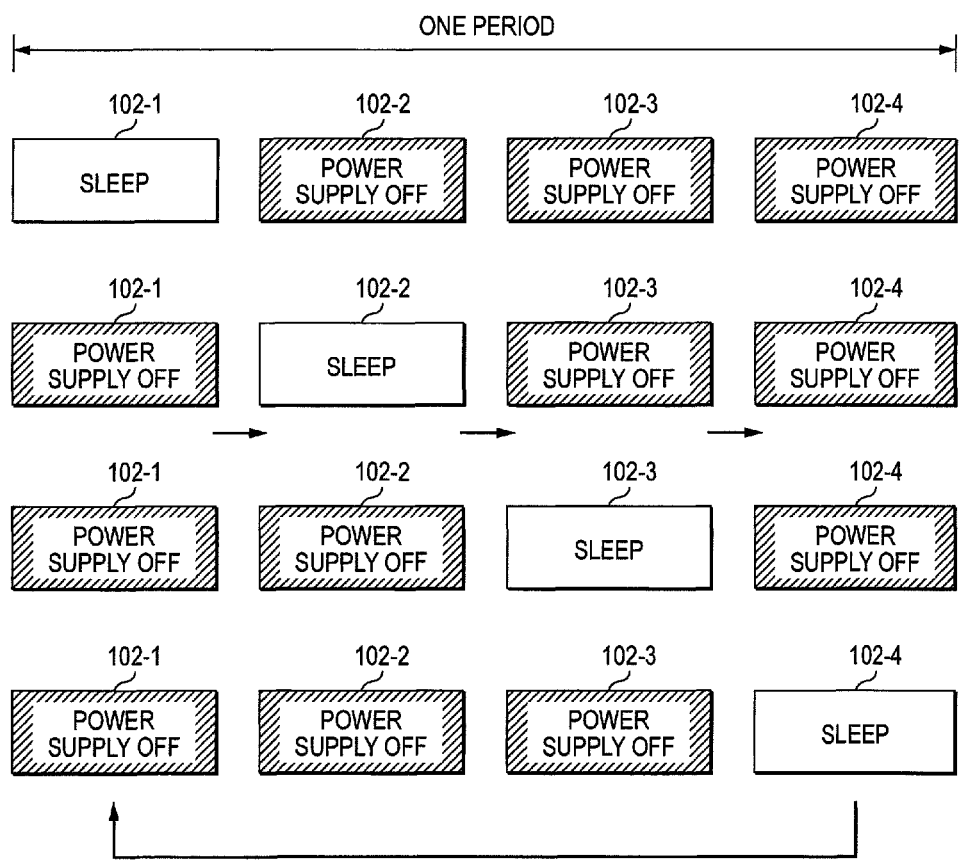
FIG. 7 is a diagram showing the transition of the switching operation of the power supply state in a group of the information processing apparatuses.

In this case, when the four information processing apparatuses 102 are restored one by one in the circulation manner, the information processing apparatus 102 to be restored to the sleep state is switched sequentially as shown in FIG. 7 under the condition that each of the four information processing apparatuses 102 is in the power supply off state. This will be explained more in detail.

First, the power supply state of the information processing apparatus 102-1 which restoration order is registered as the first is restored to the sleep state from the power supply off state. Then, the power supply state of the information processing apparatus 102-2 which restoration order is registered as the second is restored to the sleep state from the power supply off state in place of that the power supply state of the information processing apparatus 102-1 is returned to the power supply off state from the sleep state. Then, the power supply state of the information processing apparatus 102-3 which restoration order is registered as the third is restored to the sleep state from the power supply off state in place of that the power supply state of the information processing apparatus 102-2 is returned to the power supply off state from the sleep state. Then, the power supply state of the information processing apparatus 102-4 which restoration order is registered as the fourth is restored to the sleep state from the power supply off state in place of that the power supply state of the information processing apparatus 102-3 is returned to the power supply off state from the sleep state. Then, the power supply state of the information processing apparatus 102-1 which restoration order is registered as the first is again restored to the sleep state from the power supply off state in place of that the power supply state of the information processing apparatus 102-4 is returned to the power supply off state from the sleep state.

In this manner, a time period required for restoring the four information processing apparatuses 102 from the power supply off state to the sleep state one by one from the first to the fourth in the order of the restoration (to be more concrete, a time period from a time point where the power supply state of the information processing apparatus 102-1 which restoration order is registered as the first is restored to the sleep state from the power supply off state until a time point where the power supply state of the information processing apparatus 102-1 which restoration order is registered as the first is again restored to the sleep state from the power supply off state) is the one period. Hereinafter, this period is performed repeatedly to thereby sequentially restore the first to fourth information processing apparatuses 102 one by one. Thus, each of the four information processing apparatuses 102 restores to the sleep state from the power supply off state once within its one period. Further, within the one period, the four information processing apparatuses 102 restore to the sleep state from the power supply off state sequentially one by one on the time axis.

The number of the information processing apparatuses belonging to the group is registered as four in this exemplary embodiment. The number of the information processing apparatuses belonging to the group may be replaced by the registration number of IP addresses described later.

As to the IP addresses of the information processing apparatuses belonging to the group, all the IP addresses allocated to the four information processing apparatuses 102 constituting the group on the communication network 103 are registered. In other words, the information processing apparatuses 102 which IP addresses are registered in advance as one of the restoration time period setting information constitute the group of the information processing apparatuses 102. Thus, the group of the information processing apparatuses 102 are mutually related by the registration of the IP addresses.

As described above, in the case of registering the restoration time period setting information in the information processing apparatus 102-1, an operator for operating the information processing apparatus 102-1 may input the respective information necessary for the registration by means of the key board etc. or the information processing apparatus 102-1 may obtain the respective information by utilizing the communication network 103.

The restoration cause detection unit 45 detects the presence or non-presence of the restoration cause. The restoration cause is a determination information for determining whether or not the restored state is to be maintained after the restoration time period in the case where the power supply state of the own apparatus is restored to the sleep state in accordance with the restoration time period set by the restoration time period setting unit 44.

The power supply state switching unit 46 switches the power supply state of the own apparatus (image processing apparatus 1) in accordance with the instruction from the power supply state switching control unit 41. The power supply state switching unit 46 performs the switching to the sleep state from the power supply on state (the standby state), the switching to the power supply off state from the sleep state, the switching to the sleep state from the power supply off state and the switching to the power supply on state (the standby state or the run state) from the sleep state.

Succeedingly, the explanation will be made as to the concrete processing of the power supply control processing performed by using the functional configuration of the image processing apparatus 1. As described above, the information processing apparatus 102-1 is registered as the obtaining destination of the reference time and the obtaining destination of the restoration time period setting information. In this case, each of the three information processing apparatuses 102-2, 102-3 and 102-4 except for the information processing apparatus 102-1 performs the following processing.

First, before starting the power supply control processing, when the power supply sate of the image processing apparatus 1 is in the power supply on state or the sleep state, the time adjusting unit 42 obtains the information of the reference time from the information processing apparatus 102-1 registered as the obtaining destination of the reference time and adjusts the current time of the time adjusting unit 42 so as to match to the reference time. Such the time adjustment is performed simultaneously at each of the three information processing apparatuses 102-2, 102-3 and 102-4 except for the information processing apparatus 102-1. Thus, the current times of the clock units contained in the four information processing apparatuses 102 coupled to the communication network 103 are consistent with each other.

Further, before starting the power supply control processing, the setting information obtaining unit 43 obtains the restoration time period setting information from the information processing apparatus 102-1 registered as the obtaining destination of the restoration time period setting information, and the restoration time period setting unit 44 sets the restoration time period by using the restoration time period setting information obtained by the setting information obtaining unit 43. The information processing apparatus 102-1 registered as the obtaining destination of the restoration time period setting information sets the restoration time period by using the restoration time period setting information registered in the own apparatus in advance.

For the sake of the convenience of explanation, the start time point of the power supply control for the group of the information processing apparatuses is set at "Ts" and the termination time point of the power supply control for the group of the information processing apparatuses is set at "Te". Further, the restoration maintaining time period per one time is set at "Tr". As described above, Ts is registered as 6:00 p.m., Te is registered as 9:00 a.m. and Tr is registered as 30 minutes. The number of the information processing apparatuses belonging to the group is registered as N=4 as described above, and the order of the restoration is registered in the manner that the information processing apparatus 102-1 is registered as the first, the information processing apparatus 102-2 is registered as the second, the information processing apparatus 102-3 is registered as the third and the information processing apparatus 102-4 is registered as the fourth, as described above.

Further, the IP addresses of the information processing apparatuses belonging to the group are registered in a manner that, for example, the IP address of the information processing apparatus 102-1 is registered as "192.168.0.1", the IP address of the information processing apparatus 102-2 is registered as "192.168.0.2", the IP address of the information processing apparatus 102-3 is registered as "192.168.0.3", and the IP address of the information processing apparatus 102-4 is registered as "192.168.0.4".

Such the obtaining processing of the restoration time period setting information is performed in the similar manner at each of the three information processing apparatuses 102-2, 102-3 and 102-4 except for the information processing apparatus 102-1 serving as the obtaining destination (registration destination) of the restoration time period setting information. Thus, since the restoration time period setting information is shared by the four information processing apparatuses 102 coupled to the communication network 103, the restoration time period is allocated to each of the information processing apparatuses 102.

In this case, each of the information processing apparatuses 102 sharing the restoration time period setting information obtains the restoration time period (restoration time point, restoration maintaining time period) allocated to the own apparatus based on the following calculation expression.

ti Restoration time point=$Ts+(J-1+N\times i)\times(Tr-\alpha)$

Restoration maintaining time period=Tr

"J" is a numerical value representing the order of the restoration. "i" is the repetition number of times in the case where the restoration to the sleep state is repeated one time for each period and takes a value of 0, 1, 2, 3, . . . . The repetition number of times i is incremented sequentially in a manner that the repetition number becomes 0 at the first period after the start of the power supply control, then becomes 1 at the next period, and then becomes 2 at the further next period. "α" represents a time period where the restoration maintaining time period Tr of the information processing apparatus 102 restored to the sleep state at the j-th order and the restoration maintaining time period Tr of the information processing apparatus 102 restored to the sleep state at the (j+1)-th order are overlapped. The time period defined by α may be 0.

Of the restoration time point and the restoration maintaining time period for defining the restoration time period, although the restoration time points are set at different time points at respective repetition periods, the restoration maintaining time period is set at the same time period irrespective of the repetition periods. To be concrete, the information processing apparatuses 102 set the restoration maintaining time periods under the following conditions.

In the case of setting the restoration time period at the information processing apparatus 102-1, J becomes 1 since the restoration order of the information processing apparatus 102-1 is registered as the first. Thus, in the case of the information processing apparatus 102-1, at the first period (i=0), the restoration time period is set under the condition of the restoration time point=Ts and the restoration maintaining time period=Tr. At the next period (i=1), the restoration time period is set under the condition of the restoration time point=Ts+4×(Tr−α) and the restoration maintaining time period=Tr. At the further next period (i=2), the restoration time period is set under the condition of the restoration time point=Ts+8×(Tr−α) and the restoration maintaining time period=Tr. In this case, a time period required for restoring the four image forming units 10 to the sleep state from the power supply off state sequentially from the first to the fourth, that is, the time period of one period becomes "4×(Tr−α)". Thus, the restoration time point shifts by "4×(Tr−α)" each time the repetition number of times i is incremented at the information processing apparatus 102-1.

In the case of setting the restoration time period at the information processing apparatus 102-2, J becomes 2 since the restoration order of the information processing apparatus 102-2 is registered as the second. Thus, in the case of the information processing apparatus 102-2, at the first period (i=0), the restoration time period is set under the condition of the restoration time point=Ts+(Tr−α) and the restoration maintaining time period=Tr. At the next period (i=1), the restoration time period is set under the condition of the restoration time point=Ts+5×(Tr−α) and the restoration maintaining time period=Tr. At the further next period (i=2), the restoration time period is set under the condition of the restoration time point=Ts+9×(Tr−α) and the restoration maintaining time period=Tr. Hereinafter, the restoration time point shifts by "4×(Tr−α)" each time the repetition number of times i is incremented at the information processing apparatus 102-2.

In the case of setting the restoration time period at the information processing apparatus 102-3, J becomes 3 since the restoration order of the information processing apparatus 102-3 is registered as the third. Thus, in the case of the information processing apparatus 102-3, at the first period (i=0), the restoration time period is set under the condition of the restoration time point=Ts+2×(Tr−α) and the restoration maintaining time period=Tr. At the next period (i=1), the restoration time period is set under the condition of the restoration time point=Ts+6×(Tr−α) and the restoration maintaining time period=Tr. At the further next period (i=2), the restoration time period is set under the condition of the restoration time point=Ts+10×(Tr−α) and the restoration maintaining time period=Tr. Hereinafter, the restoration time point shifts by "4×(Tr−α)" each time the repetition number of times i is incremented at the information processing apparatus 102-3.

In the case of setting the restoration time period at the information processing apparatus 102-4, J becomes 4 since the restoration order of the information processing apparatus 102-4 is registered as the fourth. Thus, in the case of the information processing apparatus 102-4, at the first period (i=0), the restoration time period is set under the condition of the restoration time point=Ts+3×(Tr−α) and the restoration maintaining time period=Tr. At the next period (i=1), the restoration time period is set under the condition of the restoration time point=Ts+7×(Tr−α) and the restoration maintaining time period=Tr. At the further next period (i=2), the restoration time period is set under the condition of the restoration time point=Ts+11×(Tr−α) and the restoration maintaining time period=Tr. Hereinafter, the restoration time point shifts by "4×(Tr−α)" each time the repetition number of times i is incremented at the information processing apparatus 102-4.

In the exemplary embodiment of the invention, the restoration time period setting unit 44 completes the setting operation of the restoration time period to be applied at least at the first period (i=0) under the condition that the power supply state of the image processing apparatus 1 is the power supply on state or the sleep state, before starting the power supply control processing at the preset start time point Ts of the power supply control. Then, the setting operation of the restoration time period to be applied at the next period is performed during a time period where the power supply state of the image processing apparatus 1 is restored to the sleep state at the current period.

The allocation of the restoring time periods may be realized in a manner that, within the information processing apparatus 102 or the management server where the restoration time period setting information is registered, the restoration time point and the restoration maintaining time period of each period are obtained based on the aforesaid calculation expression for each of the N information processing apparatuses 102 belonging to the group, and each of the information processing apparatuses 102 obtains the information thus obtained.

<Power Supply Control Processing>

Figure 8:
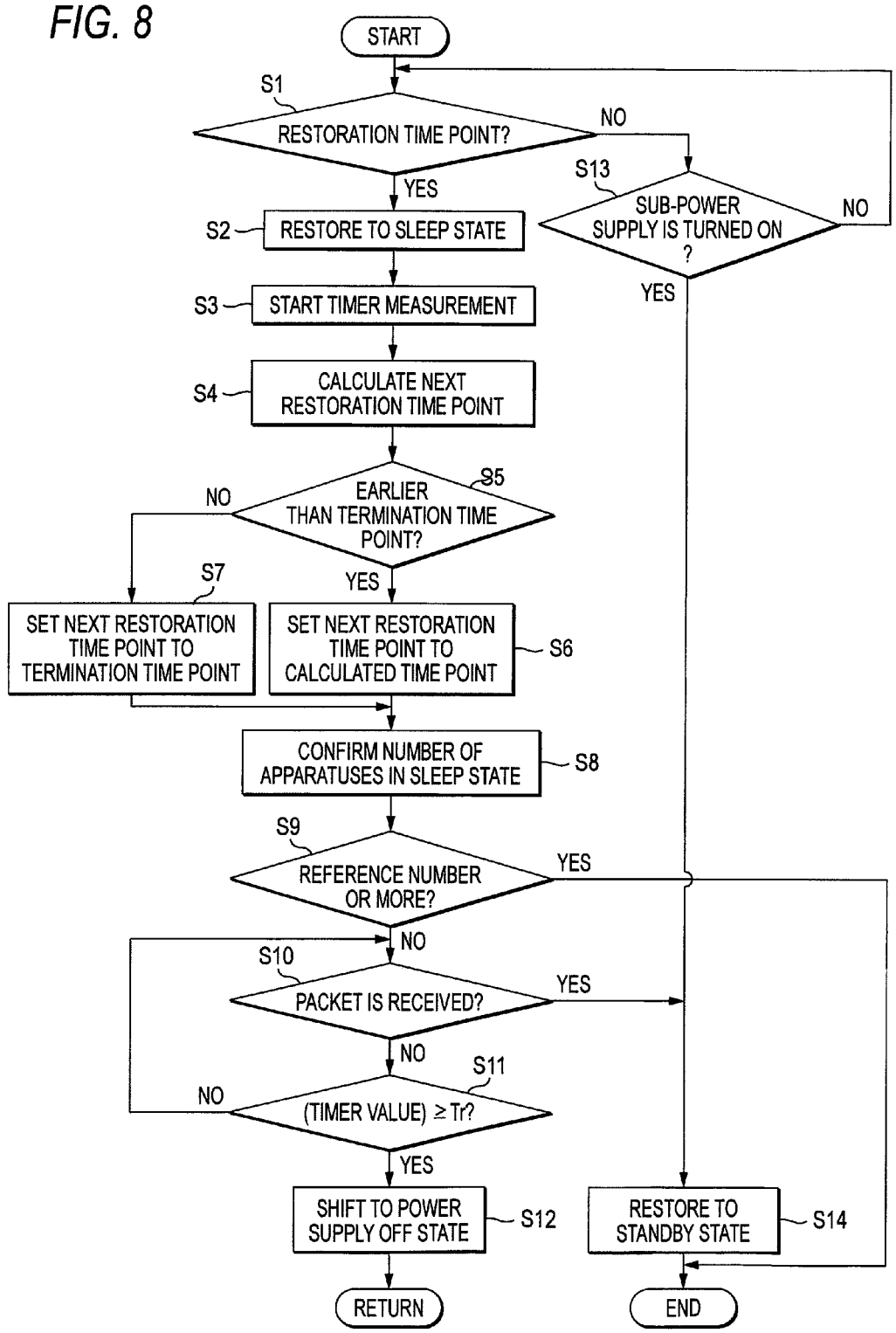
FIG. 8 is a flowchart showing the procedure of a power supply control processing performed at the image processing apparatus.

FIG. 8 is a flowchart showing the procedure of the power supply control processing performed at the image processing apparatus 1. The power supply control processing is started at each of the information processing apparatuses 102 in accordance with the start time point Ts of the power supply control contained in the restoration time period setting information in the case where the power supply states of all the four information processing apparatuses 102 are in the power supply off state.

First, the power supply state switching control unit 41 determines whether or not the current time point clocked by the clock unit 47 reaches the restoration time point set by the restoration time period setting unit 44 in advance (step S1). Then, it is determined to be No when the current time point has not reached the restoration time point, while it is determined to be Yes when the current time point has reached the restoration time point.

When it is determined that the current time point has not reached the restoration time point, the power supply state switching control unit 41 determines whether or not the sub-power supply switch 3 is turned on (step S13). It is determined to be No when the sub-power supply switch 3 is not turned on and the process returns to the step S1. In contrast, it is determined to be Yes when the sub-power supply switch 3 is turned on, and the power supply state switching control unit instructs the switching of the power supply state to the power supply state switching unit 46. The power supply state switching unit 46 receives the instruction and restores the power supply state of the image processing apparatus 1 to the standby state from the power supply off state (step S14).

The restoration processing to the sleep state from the power supply off state performed by the power supply state switching unit 46 in the two step manner of the restoration to the sleep state from the power supply off state and the restoration to the standby state from the sleep state. The image processing apparatus 1 restored to the standby state by the power supply state switching unit 46 does not shift again to the power supply off state thereafter so long as the sub-power supply switch 3 is not turned off (or the time period maintained in the standby state does not reach the predetermined time period). Thus, when the image processing apparatus is restored to the standby state in the step S14, the power supply state of the image processing apparatus 1 transits in the standby state or the sleep state even if the current restoration time period elapses. Thus, the communication function of the image processing apparatus 1 is maintained in the activated state.

On the other hand, when the current time point reaches the restoration time point, the power supply state switching control unit 41 restores the power supply state of the image processing apparatus 1 to the sleep state from the power supply off state (step S2).

Next, the power supply state switching control unit 41 starts the measurement of the time by using the timer 26 (Step S3). The measurement of the time by using the timer 26 is started in synchronism with the restoring timing of the power supply state of the image processing apparatus 1 to the sleep state from the power supply off state.

Next, the restoration time period setting unit 44 obtains the restoration time period (restoration time point, restoration maintaining time period) applied to the next period based on the aforesaid calculation expression (step S4). For example, as the repetition time period, when the current period is the first period, the restoration time period to be applied to the next (second) period is obtained under the condition of i=1. Alternatively, when the current period is the second period, the restoration time period to be applied to the next (third) period is obtained under the condition of i=2. Hereinafter, the restoration time period to be applied to the next period is obtained in the similar manner. Although not shown, the repetition number of times i is incremented by one by the control means 40 of the image processing apparatus 1 each time the repetition time period changes.

Next, the restoration time period setting unit 44 determines whether or not the restoration time point obtained as the repetition time period to be applied to the next period is earlier than the termination time point Te of the power supply control contained in the restoration time period setting information (step S5). In this case, it is determined to be Yes when the restoration time point to be applied to the next period is earlier than the termination time point Te of the power supply control, while it is determined to be No when the restoration time point to be applied to the next period is same as or later than the termination time point Te of the power supply control When it is determined to be Yes in the step S5, the restoration time point to be applied to the next period is set so as to match to the restoration time point of the restoration time period obtained in the step S4 (step S6). In contrast, when it is determined to be No in the step S5, the restoration time point to be applied to the next period is set so as to match to the termination time point Te of the power supply control (step S7).

Next, the restoration cause detection unit 45 confirms the number of information processing apparatuses 102 (hereinafter referred to "a restoration number") which current power supply states are restored to the sleep state or the power supply on state among the four (group of) information processing apparatuses 102 coupled to the communication network 103 (step S8). In the information processing apparatus 102 which current power supply state is restored to the sleep state or the power supply on state, the power is supplied to the network interface circuit 27 and the PHY chip 28. Thus, the restoration number confirmed by the restoration cause detection unit 45 corresponds to the number of the information processing apparatuses 102 which communication functions are all activated. In this case, the own apparatus is not contained in the restoration number confirmed by the restoration cause detection unit 45. Thus, the restoration number confirmed by the restoration cause detection unit 45 in the step S8 corresponds to the number of the information processing apparatuses 102 restored to the sleep state or the power supply on state except for the own apparatus.

The confirmation processing of the restoration number is performed before the time measured by the timer 26 reaches the aforesaid tome period (Tr–α) after the power supply state of the own apparatus is restored to the sleep state in the step S3. Further, the confirmation processing is performed in a manner that a request for response is sent to the information processing apparatuses 102 except for the own apparatus, by using the IP address registered in the own apparatus in advance as to the information processing apparatus 102-1 or using the IP address obtained by the setting information obtaining unit 43 in advance as to each of the information processing apparatuses 102-2, 102-3 and 102-4, and the number of the information processing apparatuses 102 actually responded to the request for response is counted.

For example, supposing that the image processing apparatus 1 performing the power supply control processing shown in FIG. 8 is the information processing apparatus 102-3, the request for response is sent to each of the information processing apparatuses 102-2, 102-3 and 102-4 by using the IP address "192.168.0.1" of the information processing apparatus 102-1, the IP address "192.168.0.2" of the information processing apparatus 102-2 and the IP address "192.168.0.4" of the information processing apparatus 102-4. Then, the restoration number is determined to be zero when there is no response from the information processing apparatuses 102-2, 102-3 and 102-4. Alternatively, the restoration number is determined to be one when there is a response from only one of these apparatuses, whilst the restoration number is determined to be two when there is responses from two of these apparatuses, and the restoration number is determined to be three when there is a response from each of these apparatuses.

Next, the restoration cause detection unit 45 determines whether or not the restoration number confirmed in the step S8 is the preset reference number or more (step S9). The exemplary embodiment of the invention is arranged to form the network environment of N=4 and M=1, as descried above. The reference number is set so as to match M. Thus, in the exemplary embodiment of the invention, the reference number is set to one.

When the restoration number is determined to be the reference number or more in the step S9, the restoration cause detection unit 45 recognizes that there is a restoration cause and so notifies the recognition result to the power supply state switching control unit 41. Thus, the power supply state switching control unit 41 completes the series of processings while maintaining the power supply sate of the own apparatus n the sleep state. In this case, the power supply state of the image processing apparatus 1 is maintained in the sleep state after the measured value of the timer 26 reaches the restoration maintaining time period Tr.

In contrast, when the restoration number is determined to be smaller than the reference number in the step S9, the restoration cause detection unit 45 confirms whether or not the network interface circuit 27 receives a packet from the external terminal apparatus 34 (step S10). This packet is sent to the image processing apparatus 1 from the terminal apparatus 34 as an instruction for requesting the restoration with respect to the image processing apparatus 1. This instruction for requesting the restoration contains a printing instruction of image information, for example.

When the reception of the packet is confirmed in the step S10, the restoration cause detection unit 45 recognizes that there is a restoration request and so notifies the recognition result to the power supply state switching control unit 41. Thus, in response to the notification from the restoration cause detection unit 45, the power supply state switching control unit 41 shifts to the processing of the step S14. As described above, in the step S14, the unit 14 instructs the power supply state switching unit 46 to switch the power supply state, and so the power supply state switching unit 46 restores the power supply state of the image processing apparatus 1 to the standby state from the power supply off state in response to the instruction.

In contrast, when the reception of the packet is not confirmed in the step S10, the power supply state switching control unit 41 confirms whether or not the measured value of the timer 26 started at the step S3 reaches the restoration maintaining time period Tr (step S11). When the measured value of the timer 26 has not reached the restoration maintaining time period Tr yet, the processing returns to the step S10. In contrast, when the measured value of the timer 26 reaches the restoration maintaining time period Tr, the power supply state of the image processing apparatus 1 is shifted to the power supply off state from the standby state (step S12).

When the power supply state of the image processing apparatus 1 is shifted to the power supply off state in the step S12, the processing returns to the step S1. Thus, the power supply state of the image processing apparatus 1 is maintained at the power supply off state until the current time point reaches the restoration time point set so as to be applied to the next period in the step S6 or S7. However, when the sub-power supply switch 3 is pushed and turned on during this power supply off state, since it is determined to be Yes in the step S13, the power supply state switching control unit 41 restores the power supply state of the image processing apparatus 1 to the standby state in response to the on signal.

The above described power supply control processing is performed as to each of the information processing apparatuses 102 until the termination time point Te of the power supply control from the start time point Ts. Thus, the power supply states of the four information processing apparatuses 102 belonging to the group change in the following manner.

Figure 9:
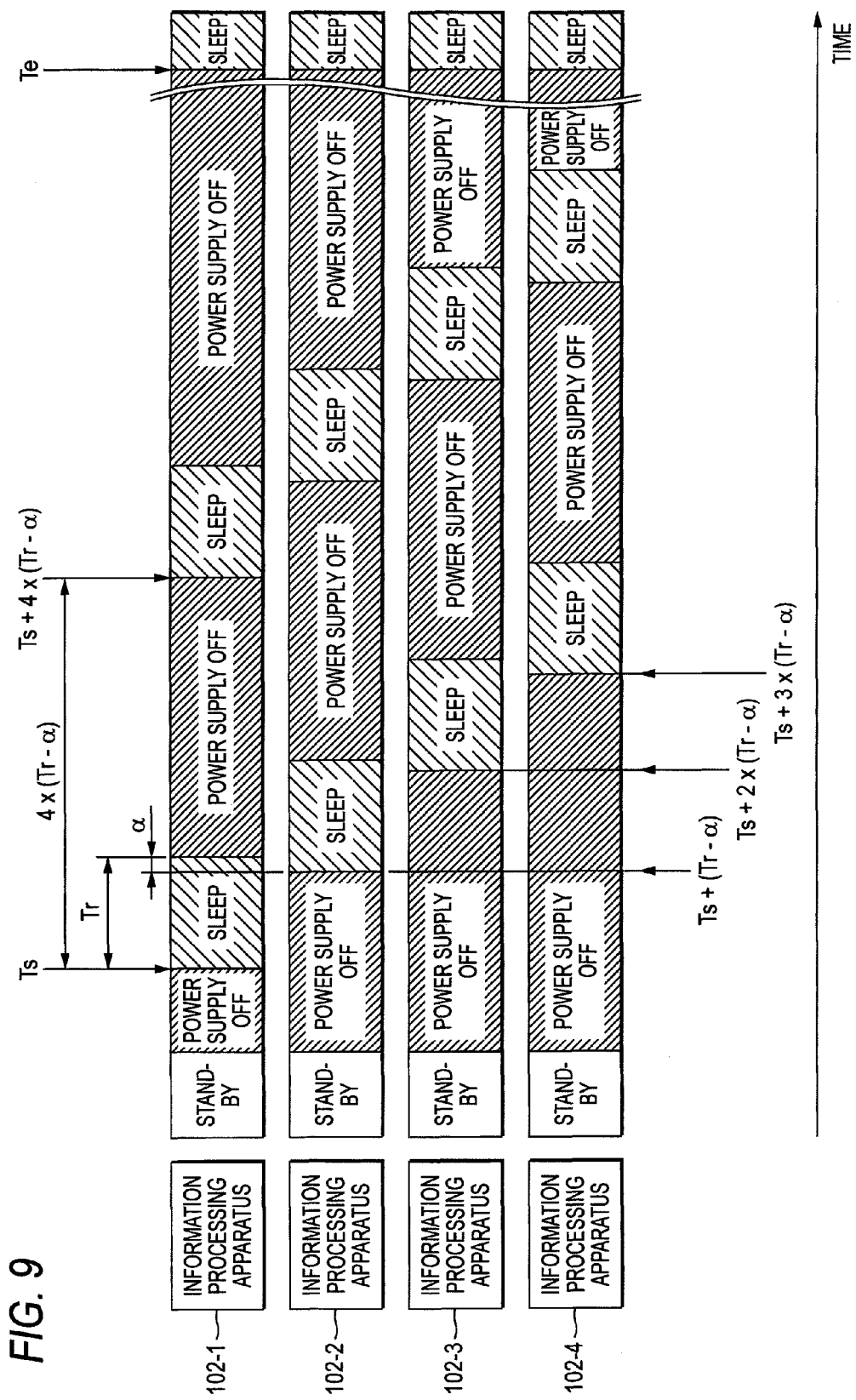
FIG. 9 is a (first) diagram showing the transition of the switching operation of the power supply state in the information processing apparatus based on the power supply control processing.

That is, as shown in FIG. 9, when the current time point reaches the start time point Ts of the power supply control after all the four information processing apparatuses 102 shift to the power supply off state, firstly the information processing apparatus 102-1 which restoration order is registered as the first is restored to the sleep state from the power supply off state simultaneously when the current time point reaches the start time point Ts. Although in FIG. 9, the four information processing apparatuses 102 shift to the power supply off state simultaneously from the standby state before the current time point reaches the start time point Ts of the power supply control, these four information processing apparatuses may shift to the power supply off state at the different timings.

Next, when the time period (Tr−α) lapses after the information processing apparatus 102-1 restores to the sleep state at the time point "Ts", the information processing apparatus 102-2 which restoration order is registered as the second is restored to the sleep state from the power supply off state. In this case, the information processing apparatus 102-2 restores to the sleep state at the time point "Ts+(Tr−α)". On the other hand, the information processing apparatus 102-1 restores to the power supply off state again when the time period Tr lapses aster the restoration to the sleep state. Thus, the time period where the information processing apparatus 102-1 restores to the sleep state overlaps by a time period α with the time period where the information processing apparatus 102-2 restores to the sleep state.

Next, when the time period (Tr−α) lapses after the information processing apparatus 102-2 restores to the sleep state at the time point "Ts+(Tr−α)", the information processing apparatus 102-3 which restoration order is registered as the third is restored to the sleep state from the power supply off state. In this case, the information processing apparatus 102-3 restores to the sleep state at the time point "Ts+2×(Tr−α)". On the other hand, the information processing apparatus 102-2 restores to the power supply off state again when the time period Tr lapses aster the restoration to the sleep state. Thus, the time period where the information processing apparatus 102-2 restores to the sleep state overlaps by a time period α with the time period where the information processing apparatus 102-3 restores to the sleep state.

Next, when the time period (Tr−α) lapses after the information processing apparatus 102-3 restores to the sleep state at the time point "Ts+2×(Tr−α)", the information processing apparatus 102-4 which restoration order is registered as the fourth is restored to the sleep state from the power supply off state. In this case, the information processing apparatus 102-4 restores to the sleep state at the time point "Ts+3×(Tr−α)". On the other hand, the information processing apparatus 102-3 restores to the power supply off state again when the time period Tr lapses aster the restoration to the sleep state. Thus, the time period where the information processing apparatus 102-3 restores to the sleep state overlaps by a time period α with the time period where the information processing apparatus 102-4 restores to the sleep state.

Next, when the time period (Tr−α) lapses after the information processing apparatus 102-4 restores to the sleep state at the time point "Ts+3×(Tr−α)", the information processing apparatus 102-1 which restoration order is registered as the first is again restored to the sleep state from the power supply off state. In this case, the information processing apparatus 102-1 restores to the sleep state at the time point "Ts+4×(Tr−α)". On the other hand, the information processing apparatus 102-4 restores to the power supply off state again when the time period Tr lapses aster the restoration to the sleep state. Thus, the time period where the information processing apparatus 102-4 restores to the sleep state overlaps by a time period α with the time period where the information processing apparatus 102-1 restores to the sleep state. Further, the time period until where the information processing apparatus 102-1 restores to the sleep state at the time point "Ts+4×(Tr−α)" after the information processing apparatus 102-1 restores to the sleep state at the time point "Ts" becomes just one period. Thus, the time period of the one period is "4×(Tr−α)" as described above.

Thus, when the four information processing apparatuses 102 do not receive the request for the restoration by the packet from the external host apparatus 101 or the sub-power supply switch 3 is not turned on, the information processing apparatuses 102 are restored to the sleep state sequentially one by one in the circulation manner. Further, when the time point reaches the termination time point Te of the power supply control, all the four information processing apparatuses 102 restore the sleep state.

Figure 10A:
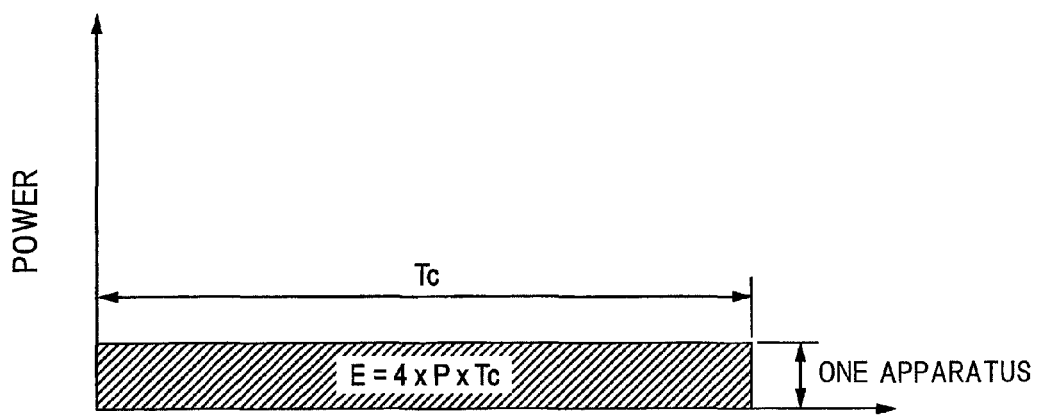
FIGS. 10A and 10B are diagrams for comparing consumption power amounts per one period.
Figure 10B:
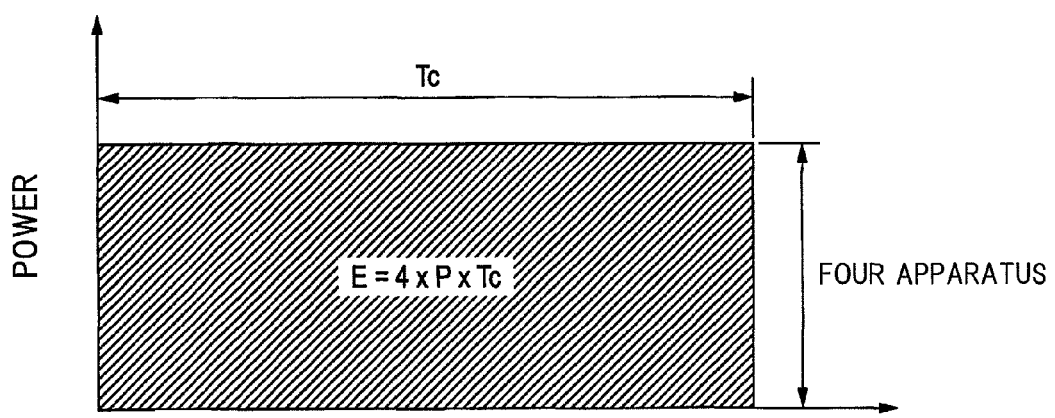

Thus, supposing that the power consumed by the information processing apparatus 102 in the sleep state is P (Watt) and the time period of the one period is Tc (hour), the power E (Wh) consumed by the four information processing apparatuses 102 during the one period until the termination time point Te from the start time point Ts of the power supply control becomes P×Tc as shown in FIG. 10A in the case where the time period α is supposed to be zero. In contrast, if all the four information processing apparatuses 102 are maintained in the sleep state during the time period until the termination time point Te from the start time point Ts, the power E (Wh) consumed by the four information processing apparatuses 102 during the one period becomes 4×P×Tc as shown in FIG. 10B. Thus, when the four information processing apparatuses 102 are restored to the sleep state sequentially one by one in the circulation manner during the time period until the termination time point Te from the start time point Ts of the power supply, the power consumption amount per one period can be reduced to one fourth.

Figure 11:
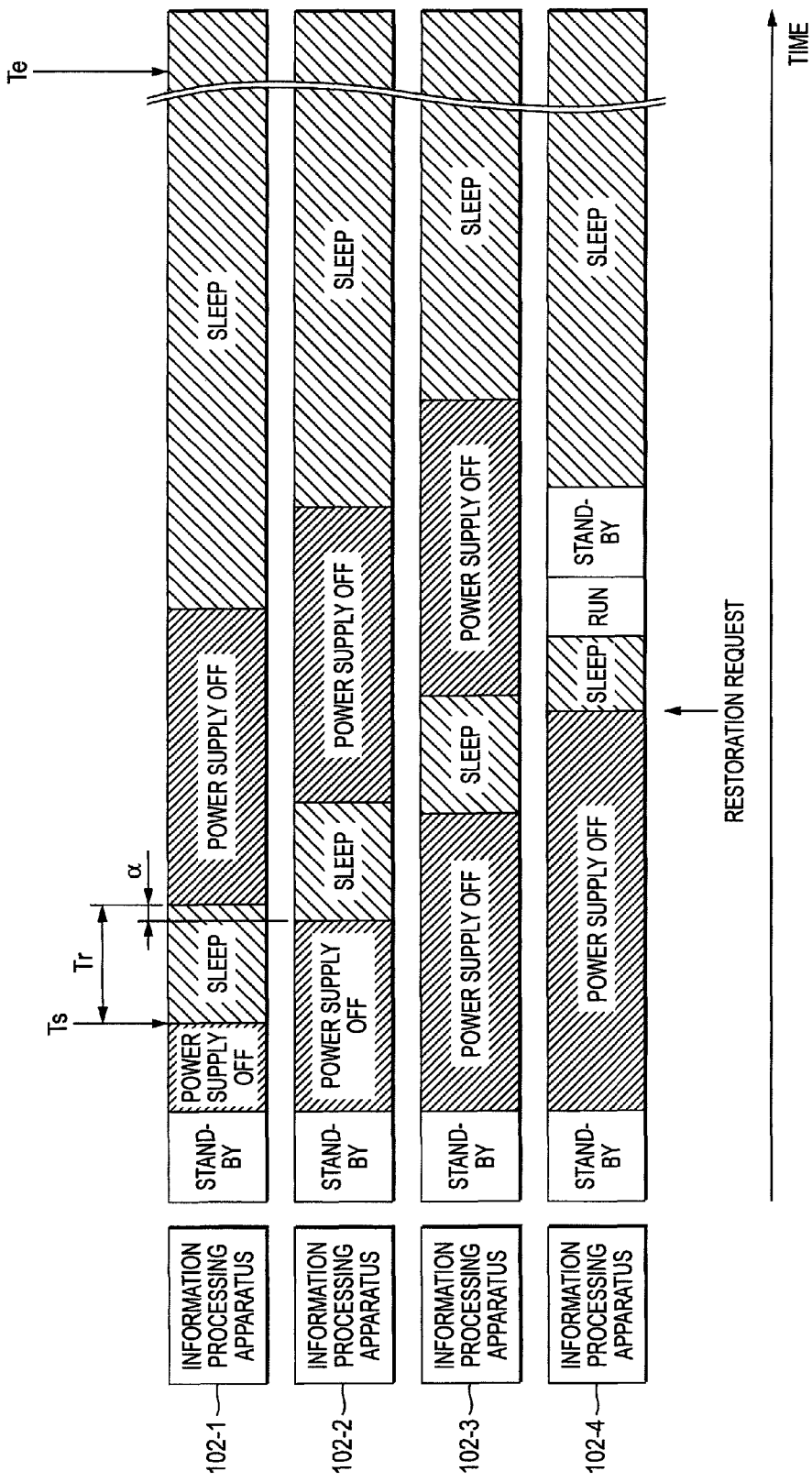
FIG. 11 is a (second) diagram showing the transition of the switching operation of the power supply state in the information processing apparatus based on the power supply control processing.

Further, for example, when the information processing apparatus 102-4 restored to the standby state receives the request for the restoration (such as the printing instruction) by the packet from the external host apparatus 101 on the way reaching the termination time point Te from the start time point Ts as shown in FIG. 11, the power supply state of each of the information processing apparatuses 102 changes in the following manner.

First, the information processing apparatus 102-4 having received the request for the restoration restores to the run state from the sleep state and executes the image forming operation based on the printing instruction from the host apparatus 101. Next, the information processing apparatus 102-4 switches to the standby state waiting for the next processing after completing the image forming operation. Further, this information processing apparatus switches to the sleep state when the stop time in the standby mode waiting for the next processing exceeds the preset time period, and this information processing apparatus maintains the sleep state.

In contrast, as to the information processing apparatus 102-1 which is restored to the sleep state after the information processing apparatus 102-4, since the restoration number confirmed by the restoration cause detection unit 45 during the restoration time period becomes one, it is determined that there is the restoration cause and hence this information processing apparatus maintains the sleep state after the restoration time period Also, as to the information processing apparatus 102-2 which is restored to the sleep state after the information processing apparatus 102-1, since the restoration number confirmed by the restoration cause detection unit 45 during the restoration time period becomes two, it is determined that there is the restoration cause and hence this information processing apparatus maintains the sleep state after the restoration time period Also, as to the information processing apparatus 102-3 which is restored to the sleep state after the information processing apparatus 102-2, since the restoration number confirmed by the restoration cause detection unit 45 during the restoration time period becomes three, it is determined that there is the restoration cause and hence this information processing apparatus maintains the sleep state after the restoration time period Thus, when the information processing apparatus 102-4 receives the request for the restoration by the packet from the external host apparatus 101 and restores to the standby state, in response thereto, the other information processing apparatuses 102-1, 102-2 and 102-3 restores to the sleep state sequentially and maintain the sleep state. In this manner, in response to that the information processing apparatus 102 restored to the sleep state receives the request for the restoration from the host apparatus 101, the state where all the four information processing apparatuses 102 are restored to the sleep state (in other words, the state where the communication function of each of the group of the information processing apparatuses 102 is activated) is autonomously generated.

Further, when one of the information processing apparatuses 102 restores to the standby state in response to the turning on of the sub-power supply switch 3 thereof on the way reaching the termination time point Te from the start time point Ts of the power supply control, since the restoration number becomes the reference number or more in response thereto, the other information processing apparatuses sequentially restore to the sleep state and maintain the sleep state. In this manner, in response to that the sub-power supply switch 3 of one of the information processing apparatuses 102 is turned on, the state where all the four information processing apparatuses 102 are restored to the sleep state is autonomously generated.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. An information processing apparatus which is included in a group of plural information processing apparatuses, the information processing apparatus comprising:
    a setting information obtaining unit that obtains information regarding time to change a power supply state of the information processing apparatus;
    a control unit that, according to the obtained information, changes the power supply state of the information processing apparatus from a first power supply state where a communication function of the apparatus is inactivated to a second power supply state where the communication function is activated and, according to the obtained information, keeps the power supply state in the second power supply state; and
    a restoration cause detection unit that detects if a restoration cause exists,
    wherein the control unit changes the power supply state of the information processing apparatus from the second power supply state to the first power supply state according to the obtained information in response to the restoration cause detection unit not detecting that the restoration cause exists, and the control unit does not change the power supply state of the information processing apparatus from the second power supply state to the first power supply state in response to the restoration cause detection unit detecting that the restoration cause exists, and
    wherein the time to change the power supply state is set so that, at all times during a set power supply control mode for the group of the plural information processing apparatuses, at least one information processing apparatus, among the group of the plural information processing apparatuses, is in the second power supply state for a period of time.

2. The information processing apparatus according to claim 1, wherein the restoration cause detection unit detects that the restoration cause exists in response to a number of information processing apparatuses in the second power supply state, among the group of the plural information processing apparatuses, being equal to or more than a reference number.

3. The information processing apparatus according to claim 1, wherein the restoration cause detection unit detects that the restoration cause exists in response to a restoration instruction being received, via the communication function, from an external host apparatus during the period of time.

4. The information processing apparatus according to claim 2, wherein the restoration cause detection unit detects that the restoration cause exists in response to a restoration instruction being received, via the communication function, from an external host apparatus during the period of time.

5. The information processing apparatus according to claim 1, wherein the time to change the power supply state is set so that the group of the plural information processing apparatuses are sequentially set to the second power supply state for the period of time.

6. The information processing apparatus according to claim 1, wherein the obtained information comprises an order of the plural information processing apparatuses such that the group of the plural information processing apparatuses are sequentially set to the second power supply state for the period of time according to the order.

7. The information processing apparatus according to claim 6, wherein the order is a repeated sequence of the plural information processing apparatuses.

8. The information processing apparatus according to claim 1, wherein the obtained information comprises a restoration maintaining time period indicating the period of time during which the information processing apparatus is maintained in the second power state after being switched from the first power state, until the information processing apparatus is to be switched back to the first power state in response to the restoration cause detection unit not detecting that the restoration cause exists.

9. The information processing apparatus according to claim 8, wherein the obtained information further comprises a restoration time point indicating a time point where the information processing apparatus is switched to the second power state from the first power state.

10. The information processing apparatus according to claim 1, wherein the obtained information comprises time information indicating a period for the set power supply control mode for the group of the plural information processing apparatuses.

11. The information processing apparatus according to claim 10, wherein the time information indicating the period for the set power supply control mode comprises at least one of a start time point for the set power supply control mode and a termination time point for the set power supply control mode.

12. The information processing apparatus according to claim 1, wherein the control unit changes the power supply state of the information processing apparatus from the second power supply state to a third power supply state in response to the restoration cause detection unit detecting that the restoration cause exists, the third power supply state being a higher power consumption state than the second power supply state.

13. An information processing system comprising:
a group of plural information processing apparatuses that are connected to each other via a network, each of the information processing apparatuses including a setting information obtaining unit, a control unit, and a restoration cause detection unit,
wherein the setting information obtaining unit obtains information regarding time to change a power supply state of the corresponding information processing apparatus,
wherein the control unit changes, according to the obtained information, the power supply state of the corresponding information processing apparatus from a first power supply state where a communication function of the corresponding information processing apparatus is inactivated to a second power supply state where the communication function is activated, and, keeps, according to the obtained information, the power supply state in the second power supply state,
wherein the restoration cause detection unit detects if a restoration cause exists,
wherein the control unit changes the power supply state of the corresponding information processing apparatus from the second power supply state to the first power supply state according to the obtained information in response to the restoration cause detection unit not detecting that the restoration cause exists, and the control unit does not change the power supply state of the corresponding information processing apparatus from the second power supply state to the first power supply state in response to the restoration cause detection unit detecting that the restoration cause exists,and
wherein the time to change the power supply state is set so that, at all times during a set power supply control mode for the group of the plural information processing apparatuses, at least one information processing apparatus, among the group of the plural information processing apparatuses is in the second power supply state for a period of time.

14. A non-transitory computer readable medium storing a program causing a computer to execute a process for controlling a power supply state of an information processing apparatus which is included in a group of plural information processing apparatuses, the process comprising:
obtains information regarding time to change a power supply state of the information processing apparatus;
changing, according to the obtained information, the power supply state of the information processing apparatus from a first power supply state where a communication function of the apparatus is inactivated to a second power supply state where the communication function is activated;
keeping, according to the obtained information, the power supply state in the second power supply state;
detecting if a restoration cause exists; and
changing the power supply state of the information processing apparatus from the second power supply state to the first power supply state according to the obtained information in response to the restoration cause detection unit not detecting that the restoration cause exists, and not changing the power supply state of the information processing apparatus from the second power supply state to the first power supply state in response to the restoration cause detection unit detecting that the restoration cause exists,
wherein the time to change the power supply state is set so that, at all times during a set power supply control mode for the group of the plural information processing apparatuses, at least one information processing apparatus, among the group of the plural information processing a apparatuses, is in the second power supply state for a period of time.

15. An information processing apparatus which is included in a group of plural information processing apparatuses, the information processing apparatus comprising:
a setting information obtaining unit that obtains information regarding time to change a power supply state of the information processing apparatus; and
a control unit that, according to the obtained information, changes the power supply state of the information processing apparatus from a first power supply state where a communication function of the apparatus is inactivated to a second power supply state where the communication function is activated, and, according to the obtained information, keeps the power supply state in the second power supply state,
wherein the control unit changes the power supply state of the information processing apparatus from the second power supply state to the first power supply state according to the obtained information, and
wherein the time to change the power supply state is set so that, at all times during a set power supply control mode for the group of the plural information processing apparatuses, at least one information processing apparatus, among the group of the plural information processing apparatuses, is in the second power supply state for a period of time.

* * * * *